United States Patent [19]

Dudt

[11] 4,277,252

[45] Jul. 7, 1981

[54] METHOD FOR PRODUCING AGGLOMERATES FROM FINELY DIVIDED CARBONACEOUS SOLIDS

[75] Inventor: Philip J. Dudt, Scenery Hill, Pa.

[73] Assignee: Conoco, Inc., Stamford, Conn.

[21] Appl. No.: 29,241

[22] Filed: Apr. 11, 1979

Related U.S. Application Data

[63] Continuation of Ser. No. 832,259, Sep. 12, 1977, abandoned.

[51] Int. Cl.³ .............................................. B01D 21/01
[52] U.S. Cl. ...................................... 23/313 R; 209/5; 210/727
[58] Field of Search ....................... 23/313, 314; 209/5, 209/171, 173, 49, 53; 264/117; 210/21, 51, 54, 727, 728, 729; 208/8

[56] References Cited

U.S. PATENT DOCUMENTS

| | | |
|---|---|---|
| 3,045,818 | 7/1962 | Müschenborn et al. ................. 209/5 |
| 3,268,071 | 8/1966 | Puddington et al. ..................... 209/5 |
| 3,856,668 | 12/1974 | Shubert ..................................... 209/5 |

Primary Examiner—Hiram Bernstein
Attorney, Agent, or Firm—F. Lindsey Scott; William A. Mikesell, Jr.

[57] ABSTRACT

A method for producing agglomerate particles from finely divided carbonaceous solids by mixing the solids with oil in an aqueous medium in a first mixing zone; passing the mixture to a second mixing zone; and mixing an additional quantity of finely divided carbonaceous solids with the mixture in the second mixing zone.

10 Claims, 1 Drawing Figure

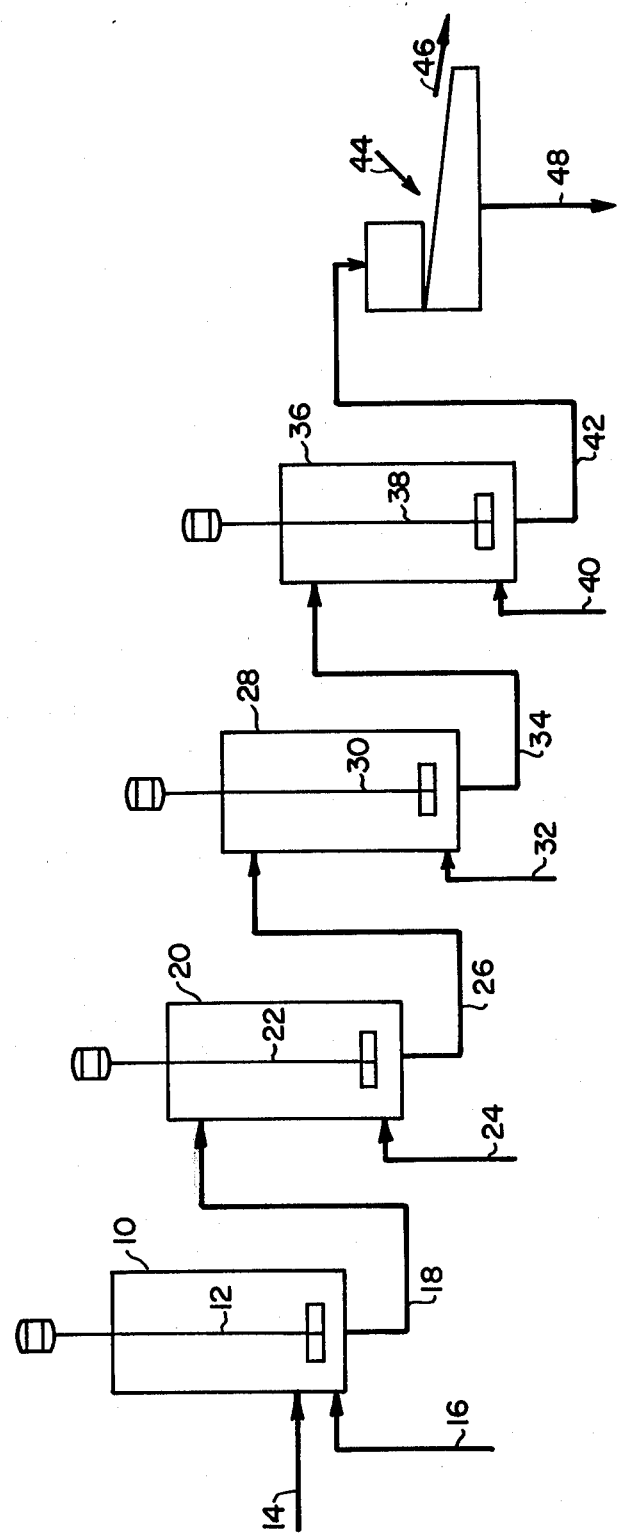

METHOD FOR PRODUCING AGGLOMERATES FROM FINELY DIVIDED CARBONACEOUS SOLIDS

This is a continuation of application Ser. No. 832,259, filed Sept. 12, 1977, now abandoned.

This invention relates to the production of agglomerate particles from finely divided carbonaceous solids.

This application further relates to an improvement in methods for the production of agglomerate particles from finely divided carbonaceous solids wherein oil is mixed with the carbonaceous solids and mixed in an aqueous medium.

In many industrial applications, finely divided carbonaceous particles are produced as a by-product and unless a suitable method is available for using such materials as fuel or the like, the finely divided carbonaceous solids constitute a waste. In some instances, quantities of finely divided carbonaceous solids are produced in a dry form, while in other instances, they may be produced in the form of aqueous slurries containing the finely divided solids. For instance, in coal mining operations, finely divided coal is produced as a by-product which is normally not recovered in coal cleaning operations and the like. In many instances, aqueous solutions containing such finely divided coal are pumped into holding ponds or the like commonly referred to in the industry as "blackwater ponds". In many instances, water is recycled or lost from such ponds as a result of evaporation or the like over a period of time, with the result that, in many parts of the country, ponds containing substantial quantities of such finely divided carbonaceous solids exist. In many instances, these ponds have been caused to overflow by heavy rains and the like, thus resulting in washing the finely divided coal into nearly streams where it constitutes an unsightly pollutant. A considerable amount of effort has been directed to methods whereby these finely divided carbonaceous solids, i.e. coal, can be recovered from such blackwater ponds. In other industrial processes such as petroleum refining, the production of petroleum coke, and the like, aqueous streams containing finely divided carbonaceous solids are also produced. As a result of the continuing interest in methods for converting these finely divided carbonaceous solids into usable, industrial fuels, a continuing search has been directed to methods for agglomerating such particles.

It has long been known that such finely divided carbonaceous particles can be mixed with oil in the presence of water to form agglomerates. Many variations in this process are known such as, for instance, adding carbonaceous solids and oil to one or to a plurality of mixing zones as shown for instance in U.S. Pat. No. 1,420,164, issued June 20, 1922 to Trent. The use of a first agglomerating zone wherein the carbonaceous solids and oil are mixed in the presence of an aqueous medium, followed by the addition of a solids-containing stream and an oil stream to produce agglomerates is shown in U.S. Pat. No. 3,268,071, issued Aug. 23, 1966, to Puddington et al. Many such variations are known to those skilled in the art; however, most such processes have resulted in the production of agglomerates which are relatively small in size and which contain substantial quantities of water. Clearly, the usefulness of the agglomerates produced is directly related to their production in a usable size and to the production of agglomerates which contain minor amounts of water. The resolution of these two problems has been the object of a continuing search.

It has now been found that, in such methods for producing agglomerate particles from finely divided carbonaceous solids by mixing the solids and oil in an aqueous medium in a first mixing zone to form a mixture and further mixing the mixture in at least one other mixing zone thereby forming the agglomerate particles, improved results are achieved by admixing an additional quantity of finely divided carbonaceous solids with the mixture in at least one of the other mixing zones.

FIG. 1 is a schematic diagram of a process utilizing the improvement of the present invention.

In the FIGURE, a first mixing zone 10 is shown equipped with a mixer 12. Oil and finely divided carbonaceous solids are introduced into mixing zone 10 through inlet lines 14 and 16 respectively. Typically, the aqueous solution is introduced with the carbonaceous solids and is so shown in the FIGURE. The feedstream entering through line 16 is a slurry of carbonaceous solids in water in a desired concentration. After mixing for a desired period of time in vessel 10, "inversion" occurs. "Inversion" is used to refer to the phenomenon wherein the carbonaceous solids become coated with oil and begin to agglomerate and separate from the aqueous medium. The degree of mixing in mixer 10 is desirably adjusted to accomplish this objective, i.e. the carbonaceous solids begin to agglomerate in mixer 10. The mixture is then withdrawn from mixer 10 through a line 18 and passed to a second vessel 20, which includes a mixer 22. An additional quantity of carbonaceous solids is introduced into vessel 20 through a line 24 and mixed with the material entering through line 18. After mixing, the resulting mixture is removed from vessel 20 through a line 26 to a third vessel 28 which includes a stirrer 30. An additional quantity of oil is added to vessel 28 through a line 32 and mixed with the material entering through line 26. The resulting mixture is withdrawn from vessel 28 through a line 34 and passed to a fourth vessel 36 which includes a mixer 38. An additional quantity of carbonaceous solids is introduced into vessel 36 via line 40. The solids introduced through line 40 are mixed with the material entering through line 34 and the resulting mixture is withdrawn through a line 42 and passed to a screen 44 where the agglomerates formed are recovered from the screen as shown by an arrow 46 with the fluid and unagglomerated solids being recovered as shown by an arrow 48 and optionally passed to recycle, a settling pond or the like. In the operation of the process shown in the FIGURE, the concentration of the aqueous slurry containing the finely divided carbonaceous solids introduced into mixer 10 through line 16 is adjusted to a desired concentration which is desirably from about 10 to about 40 weight percent solids. Desirable results have been obtained when the solids content of the aqueous slurry is from about 20 to about 35 weight percent solids. Desirably, the oil is present in an amount equal to from about 10 to about 30 weight percent based upon the weight and surface area of the carbonaceous solids. Particularly desirable results have been achieved when about 15 weight percent oil was used. The amount of oil used is based upon the quantity of carbonaceous solids in the feed slurry since clays, gangues and the like do not tend to be preferentially wet by the oil as do the carbonaceous solids. Such materials are not readily agglomerated by such a technique and desirably are not so agglomerated since they are desirably recovered with the liquid stream at screen 44. Processes of the type discussed herein are typically used, not only to agglomerate the carbonaceous solids, but to clean the carbonaceous solids of clays, gangues, and the like. Such materials are desirably removed since they are, in general, non-combustible and result in the production of ash when the coal agglomerates are burned. In first vessel 10, which is in some instances referred to as an inverter, or the like, a relatively high mixing rate is used. Mixing rates from about 0.3 to about 1.25 hp/ft$^3$ are commonly used with values from about 0.4 to about 0.7 hp/ft$^3$ being more common. The optimum degree of agitation is variable depending upon the particular solids being subjected to agglomeration, the types of oil used and the like. Normally, the inversion is complete when the presence of oil is no longer observed in the inverter, although such a general rule of thumb is clearly subject to qualification when excessive amounts of oil are used, or the like. Normally, a color change occurs in the mixture when the particles become coated with oil, i.e. the bulk of the oil is removed from the aqueous solution. The carbonaceous solids coated with oil will begin to agglomerate to some extent in the inverter in many instances although normally the agglomerates formed are relatively small. The carbonaceous solids charged to the inverter are typically small, i.e. normally less than a −14 Tyler screen. Larger particles can, of course, be included but clearly, when larger particles are present, the desirability of agglomerating the particles becomes of less interest since the particles are already of a substantial size.

In subsequent mixing vessels, lower rates of agitation are used. Values from about 0.3 to about 0.4 hp/ft$^3$ are typical. In many instances, the rate of agitation or mixing is decreased progressively from a second to a third to a fourth mixing vessel, or the like.

Although in the FIGURE, four mixing zones are shown, the improvement of the present invention in its simplest form can be practiced using two mixing zones. For instance, after mixing the oil and solids in the first mixing zone, the resulting mixture, after passage to a second mixing zone, is mixed with an additional quantity of finely divided solids. The second stream of finely divided solids can be the same or a different stream, although it is preferred that both streams of solids comprise carbonaceous solids. The addition of the second stream of carbonaceous solids to the second mixing zone (vessel 20) results in the production of larger agglomerates and results in the absorption of any excess oil which may be present as a result of the addition of oil and solids to the first mixer (vessel 10). While desirable results are achieved by the use of this arrangement, the use of the third and fourth mixing zones to produce larger agglomerates which are more compact and contain less water, is desirable. In the operation of the embodiment shown in the FIGURE, oil is added to the third mixing zone (vessel 28) with additional solids being added to the fourth mixing zone (vessel 36). This sequential addition of oil and solids to alternate mixing zones results in the production of larger agglomerate particles which are more compact and contain less water. A plurality of mixing zones can be used depending upon the size of the agglomerates desired, although it is believed that in most instances, from two to five mixing zones will be found to be suitable. The use of two mixing zones reflects the embodiment first described above, whereas the use of five mixing zones relates to substantially the process shown with optionally a fifth mixing zone wherein further agglomeration occurs. Clearly, additional pairs of mixing zones could be incorporated within the spirit of the present invention. It is however, desirable that the last mixing zone be either a further agglomeration vessel or a mixing vessel to which solids are added. Clearly, the use of additional oil in the last mixer results in a possibility of excess oil in the recovered water which is undesirable in some instances. As shown in the FIGURE, the agglomerates are recovered using a screen or the like with the agglomerates being sent to drying or other processing as desired to convert them into a desired end product. Clearly, such agglomerates are desirable as fuels for most uses for which coal can be used. The water recovered from the screen or the like is optionally recycled, passed to a settling pond or the like.

The solids charged to vessel 10 may vary from dry to very dilute slurries. Clearly, the concentration of the solids must be adjusted in mixer 10 and, as indicated, such is normally done by dilution or concentration of the aqueous stream charged to vessel 10, although it is possible that the solids could be charged with the oil stream, or as a separate stream. Such variations are clearly within the skill of those skilled in the art and need not be discussed further except to note that, desirably, the concentration of the solids in the aqueous mixture in vessel 10 should be adjusted as discussed above.

Oils, suitable for use in the present process, are typically petroleum-derived oils although tars and oils derived from coal or the like may be used, if available. As indicated, some suitable oils are pentane, hexane, heptane, benzene, toluene, gasoline, kerosene, diesel fuel, gas oil, residual fuel oils, heavy gas oil, mixtures thereof and the like. The oils used are typically derived from petroleum and such oils generally are suitable so long as the boiling point is sufficiently high that little vaporization occurs during the mixing step and so long as the oil is suitably liquid at the processing conditions. Desirably, the oil is selected from such oils as kerosene, diesel oil, fuel oil and the like. Such oils are well known to those skilled in the art and need not be discussed further.

Having thus described the present invention with respect to certain of its preferred embodiments, it is pointed out that the embodiments discussed above, while preferred, are illustrative rather than limiting in nature. Many variations and modifications are possible within the scope of the present invention and it is anticipated that many such variations and modifications may appear obvious or desirable to those skilled in the art upon a review of the foregoing description of preferred embodiments.

Having thus described the invention, I claim:

1. In a method for producing agglomerate particles from an aqueous feed slurry containing from about 10 to about 40 weight percent solids, said solids comprising finely divided carbonaceous solids, clays and gangues by mixing said aqueous slurry containing said solids and oil in a first mixing zone to form a mixture and thereafter further mixing said mixture in at least one other mixing zone thereby forming said agglomerate particles containing said carbonaceous solids and said oil which are thereafter separated from said clays and gangues, the improvement consisting essentially of admixing an additional quantity of aqueous feed slurry containing said solids with said mixture in at least one of said other mixing zones.

2. The improvement of claim 1 wherein a plurality of mixing zones are used, said mixture being produced in a first mixing zone and passed sequentially through said plurality of mixing zones.

3. The improvement of claim 2 wherein said additional quantity of aqueous feed slurry containing said solids is added to a second mixing zone.

4. The improvement of claim 3, wherein an additional quantity of oil is added to a third mixing zone and a second additional quantity of aqueous slurry containing said solids is added to a fourth mixing zone.

5. The improvement of claim 2 wherein additional quantities of aqueous slurry containing said solids and oil respectively are admixed with said mixture in alternate mixing zones, with an additional quantity of aqueous slurry containing said solids being added to a second mixing zone, an additional quantity of oil being added to a third mixing zone in a repeating sequence of alternating additions.

6. The improvement of claim 5 wherein an additional quantity of aqueous slurry containing said solids is added to the last mixing zone.

7. The improvement of claim 5 wherein from 3 to 5 mixing zones are used.

8. A method for producing agglomerate particles from an aqueous slurry containing from about 10 to about 40 weight percent finely divided carbonaceous solids, said method consisting essentially of:
  (a) admixing said slurry and oil in a first mixing zone to produce a mixture;
  (b) passing said mixture to a second mixing zone; and
  (c) admixing an additional quantity of aqueous slurry containing said solids with said mixture in said second mixing zone.

9. The method of claim 8 wherein said mixture is passed to a third mixing zone and an additional quantity of oil is admixed with said mixture in said third mixing zone and wherein said mixture is passed to a fourth mixing zone and an additional quantity of aqueous slurry containing said solids is admixed with said mixture in said fourth mixing zone.

10. The method of claim 8 wherein said slurry and oil are added alternately and sequentially to a plurality of mixing zones with slurry being added to the last mixing zone.

* * * * *